(12) United States Patent
Kim et al.

(10) Patent No.: US 12,705,863 B2
(45) Date of Patent: Aug. 11, 2026

(54) APPARATUS AND METHOD FOR CLASSIFYING IMMORAL IMAGES USING DEEP LEARNING TECHNOLOGY

(71) Applicant: KOREA UNIVERSITY RESEARCH AND BUSINESS FOUNDATION, Seoul (KR)

(72) Inventors: Jin Kyu Kim, Seoul (KR); Yu Jin Jeong, Seoul (KR); Seong Beom Park, Hwaseong-si (KR)

(73) Assignee: Korea University Research and Business Foundation, Seoul (KR)

( * ) Notice: Subject to any disclaimer, the term of this patent is extended or adjusted under 35 U.S.C. 154(b) by 299 days.

(21) Appl. No.: 18/490,299

(22) Filed: Oct. 19, 2023

(65) Prior Publication Data

US 2024/0046616 A1 Feb. 8, 2024

(30) Foreign Application Priority Data

Apr. 14, 2023 (KR) ........................ 10-2023-0049560

(51) Int. Cl.
*G06V 10/764* (2022.01)
*G06F 16/35* (2025.01)
(Continued)

(52) U.S. Cl.
CPC ............ *G06V 10/764* (2022.01); *G06F 16/35* (2019.01); *G06F 18/24* (2023.01); *G06F 40/10* (2020.01);
(Continued)

(58) Field of Classification Search
CPC ........ G06N 3/08; G06N 20/00; G06N 3/0455; G06N 3/09; G06N 3/0442; G06N 3/044;
(Continued)

(56) References Cited

U.S. PATENT DOCUMENTS

2017/0147910 A1* 5/2017 Mao ........................ G06N 3/044
2020/0065156 A1* 2/2020 Nag ...................... G06F 9/5077
(Continued)

FOREIGN PATENT DOCUMENTS

KR 10-2021-0065390 A 6/2021
KR 10-2358186 B1 1/2022
(Continued)

OTHER PUBLICATIONS

Moradi et al., Recognizing Objectionable Images Using Convolutional Neural Nets, Dec. 16-17, 2015 [retrieved Oct. 8, 2025], 2015 Signal Processing and Intelligent Systems Conference (SPIS), pp. 133-137. DOI: 10.1109/SPIS.2015.7422327 (Year: 2015).*
(Continued)

*Primary Examiner* — Henok Shiferaw
*Assistant Examiner* — Dennis Rosario
(74) *Attorney, Agent, or Firm* — NSIP Law

(57) ABSTRACT

Disclosed is an apparatus for classifying immoral images according to one embodiment of the present invention, comprising: a text encoder unit that receives a learning text as an input to create a textual embedding vector; an image encoder unit that receives an image as an input to create a visual embedding vector; and a morality classification unit that receives either the textual embedding vector or the visual embedding vector as an input to create and output a classification result indicating whether the input text or image is moral or immoral, wherein the morality classification unit learns the classification results of the input learning texts only from a learning dataset containing a plurality of learning texts in which whether each learning text is moral or immoral is mapped to a binary class.

9 Claims, 10 Drawing Sheets

(51) Int. Cl.

| | |
|---|---|
| ***G06F 18/24*** | (2023.01) |
| ***G06F 40/10*** | (2020.01) |
| ***G06F 40/279*** | (2020.01) |
| ***G06N 3/02*** | (2006.01) |
| ***G06N 3/045*** | (2023.01) |
| ***G06N 3/0455*** | (2023.01) |
| ***G06N 3/08*** | (2023.01) |
| ***G06N 5/04*** | (2023.01) |
| ***G06N 20/00*** | (2019.01) |
| ***G06V 10/70*** | (2022.01) |
| ***G06V 10/80*** | (2022.01) |
| ***G06V 10/82*** | (2022.01) |
| ***G06V 30/19*** | (2022.01) |
| ***G06V 30/413*** | (2022.01) |
| ***G06V 40/16*** | (2022.01) |

(52) U.S. Cl.

CPC ............. *G06F 40/279* (2020.01); *G06N 3/02* (2013.01); *G06N 3/045* (2023.01); *G06N 3/0455* (2023.01); *G06N 3/08* (2013.01); *G06N 5/04* (2013.01); *G06N 20/00* (2019.01); *G06V 10/70* (2022.01); *G06V 10/809* (2022.01); *G06V 10/811* (2022.01); *G06V 10/82* (2022.01); *G06V 30/19173* (2022.01); *G06V 30/413* (2022.01); *G06V 40/172* (2022.01)

(58) Field of Classification Search

CPC ........ G06N 3/045; G06N 3/02; G06N 3/0464; G06N 3/008; G06N 3/004; G06N 3/006; G06N 5/04; G06V 10/82; G06V 10/70; G06V 20/41; G06V 20/35; G06V 10/764; G06V 20/70; G06V 30/19173; G06V 10/765; G06V 20/62; G06V 40/172; G06V 10/74; G06V 10/761; G06V 10/811; G06V 10/80; G06V 10/809; G06V 30/00; G06V 30/413; G06V 30/19007; G06V 30/19093; G06V 30/1444; G06V 30/414; G06V 30/43; G06T 2207/20081; G06T 9/002; G06T 9/00; G06F 18/24; G06F 18/243; G06F 16/35; G06F 40/40; G06F 16/285; G06F 16/45; G06F 18/217; G06F 40/126; G06F 40/279; G06F 40/10

See application file for complete search history.

(56) References Cited

U.S. PATENT DOCUMENTS

| | | | | |
|---|---|---|---|---|
| 2020/0410228 | A1* | 12/2020 | Wang ...................... | G06F 21/55 |
| 2023/0351202 | A1* | 11/2023 | Sakhinana ............. | G06N 3/088 |

FOREIGN PATENT DOCUMENTS

| | | | |
|---|---|---|---|
| KR | 10-2022-0075638 | A | 6/2022 |
| KR | 10-2410582 | B1 | 6/2022 |
| KR | 10-2022-0122385 | A | 9/2022 |
| KR | 10-2023-0018952 | A | 2/2023 |
| KR | 10-2023-0029281 | A | 3/2023 |

OTHER PUBLICATIONS

Bahdanau et al., Neural Machine Translation By Jointly Learning To Align and Translate, May 19, 2016 [retrieved Oct. 8, 2025], Cornell University: arXiv, version [v7], pp. 1-15. https://doi.org/10.48550/arXiv.1409.0473 (Year: 2016).*

Tan, Text2Scene: Generating Compositional Scenes from Textual Descriptions, Jun. 9, 2019 [retrieved Oct. 8, 2025], Cornell University: arXiv, version [v3], 17 pages. https://doi.org/10.48550/arXiv.1809.01110 (Year: 2019).*

Radevski et al., Decoding Language Spatial Relations to 2D Spatial Arrangements, Nov. 2020 [retrieved Oct. 8, 2025], Findings of the Association for Computational Linguistics: EMNLP 2020, pp. 4549-4560. DOI: 10.18653/v1/2020.findings-emnlp.408 (Year: 2020).*

Sunder et al., Handling Class Imbalance in Low-Resource Dialogue Systems by Combining Few-Shot Classification and Interpolation, May 13, 2021 [retrieved Oct. 8, 2025], 2021 IEEE International Conference on Acoustics, Speech and Signal Processing (Year: 2021), pp. 7633-7637. https://doi.org/10.1109/ICASSP39728.2021.9413405 (Year: 2021).*

Ravi, Multimodal Story Comprehension: Datasets, Tasks and Neural Models, 2021 [retrived Oct. 8, 2025], Rutgers University, 179 pages. https://doi.org/doi:10.7282/t3-6xj3-1n36 (Year: 2021).*

Wang et al., MaskNet: Introducing Feature-Wise Multiplication to CTR Ranking Models by Instance-Guided Mask, Jul. 26, 2021 [retrieved Oct. 8, 2025], Cornell University: arXiv, version [v2], 9 pages. https://doi.org/10.48550/arXiv.2102.07619 (Year: 2021).*

Shin et al., e-CLIP: Large-Scale Vision-Language Representation Learning in E-commerce, CIKM '22: Proceedings of the 31st ACM International Conference on Information & Knowledge Management Oct. 17, 2022 [retrieved Oct. 8, 2025], 11 pages. https://doi.org/10.1145/3511808.355706 (Year: 2022).*

Park et al, Judge, Localize, and Edit: Ensuring Visual Commonsense Morality for Text-to-Image Generation, Cornell University: arXiv, version [v1], Dec. 7, 2022 [retrieved Oct. 8, 2025], 10 pages. https://doi.org/10.48550/arXiv.2212.03507 (Year: 2022).*

Jeong et al.. Zero-shot Visual Commonsense Immorality Prediction, Nov. 10, 2022 [retrieved Oct. 8, 2025], Cornell University: arXiv, version [v1], 22 pages. https://doi.org/10.48550/arXiv.2211.05521 (Year: 2022).*

Yang et al., DOMFN: A Divergence-Orientated Multi-Modal Fusion Network for Resume Assessment, Oct. 10, 2022 [retrieved Oct. 8, 2025], MM '22: Proceedings of the 30th ACM International Conference on Multimedia, pp. 1612-1620. https://doi.org/10.1145/3503161.3548203 (Year: 2022).*

Schramowski et al., Can Machines Help US Answering Question 16 in Datasheets, and in Turn Reflecting on Inappropriate Content ?, Jun. 20, 2022 [retrieved Feb. 23, 2026], FAccT '22: Proceedings of the 2022 ACM Conference on Fairness, Accountability, and Transparency, pp. 1350-1361. (Year: 2022) https://doi.org/10.1145/3531146.3533192 (Year: 2022).*

Kumaresh, Multi-Speaker Speech Synthesis with Diverse Prosody Control using Generative Adversarial Networks [Thesis: Otto Von Guericke Universitat Magdeburg], uploaded Aug. 22, 2022 [retrieved Mar. 5, 2026], 99 pages. Retrieved: (Year: 2022) https://www.researchgate.net/publication/362806180_ Multi-Speaker_Speech_Synthesis_with_Diverse_Prosody_Control_using_Generative_Adversarial_Networks (Year: 2022).*

Lee et al., LISA: Localized Image Stylization with Audio via Implicit Neural Representation, Nov. 21, 2022 [retrieved Mar. 5, 2026], Cornell University: arXiv, version [v1], 16 pages. https://doi.org/10.48550/arXiv.2211.11381 (Year: 2022).*

Nguyen et al., HADA: A Graph-based Amalgamation Framework in Image-text Retrieval, Jan. 11, 2023 [retrieved Mar. 3, 2026], Cornell University:arXiv, version [v1], 16 pages. https://doi.org/10.48550/arXiv.2301.04742 (Year: 2023).*

Schramowski, Self-Supervised Learning of Machine Ethics [thesis], date available: Oct. 29, 2025 [retrieved Feb. 23, 2026], Technical University of Darmstadt, 230 pages. DOI 10.26083/tuprints-00023090 (Year: 2025).*

Jeong, Yujin, et al. "Zero-shot Visual Commonsense Immorality Prediction." arXiv preprint arXiv:2211.05521 (2022).

* cited by examiner

FIG. 3

| ETHICS Dataset (Commonsense Morality) | |
|---|---|
| Immoral | Moral |
| • I painted the entire school with a nude lady.<br>• I tied up the girl in a stall in the barn.<br>• I fed my neighbor's dog the expired meat. | • I cheered loudly at the football game.<br>• I practiced at the arcade machine to win the game.<br>• I was tired from all the work I did at the farm. |

FIG. 8
Classified as Moral
Classified as Immoral
Plastic Bag
Hammer
Whiskey Jug
Syringe
Notebook
Seat Belt
Mountain Bike
Banana
Book Jacket

APPARATUS AND METHOD FOR CLASSIFYING IMMORAL IMAGES USING DEEP LEARNING TECHNOLOGY

CROSS-REFERENCE TO RELATED PATENT APPLICATION

This application claims the benefit of Korean Patent Application No. 10-2023-0049560, filed on Apr. 14, 2023, in the Korean Intellectual Property Office, the disclosure of which is incorporated herein in its entirety by reference.

BACKGROUND OF THE INVENTION

1. Field of the Invention

The present invention relates to an apparatus and method for classifying immoral images. More specifically, the present invention relates to an apparatus and method capable of classifying immoral images without learning about images.

2. Description of the Related Art

In 2020, the global digital content market recorded $2.516 trillion in revenue, and it is expected that the digital content market will continue to grow in size, driven by the trend of network development and the grow adoption of mobile lifestyles, and it is projected to reach $4.43 trillion by 2025, with an average annual growth rate of 12.0%.

As the demand for digital content continues to increase both domestically and internationally, various institutions and companies are actively developing technologies to automatically classify immoral content, and traditional technologies for classifying immoral content have primarily focused on natural language texts as their main target.

Moreover, some technologies for classifying immoral image have been predominantly limited to specific areas such as violence, sexuality, etc. limiting their applicability to only those specific purposes. Therefore, there is a significant challenge in classifying images as immoral at the level of general human intelligence without being limited to specific areas. Furthermore, even when attempting to train artificial intelligence models for this purpose, there is also a challenge in classifying images because there is no suitable visual learning dataset with universal human morality. Therefore, a more fundamental solution is required to address these challenges, and the present invention has been made in view of the above circumstances.

REFERENCES OF THE RELATED ART

Patent Document

Korean Patent Application Publication No.: 10-2022-0075638 (published on Jun. 8, 2022)

SUMMARY OF THE INVENTION

The present invention has been made in an effort to solve the above-described problems associated with prior art, and an object of the present invention is to provide an apparatus and method for classifying immoral images, which can classify images that can be considered as immoral at the level of general human intelligence without being limited to specific areas.

Another object of the present invention is to provide an apparatus and method for classifying immoral images, which can effectively classify immoral images even in a situation where there is no suitable visual learning dataset with universal human morality.

The above-mentioned objects of the present invention are not limited to those mentioned above, and other objects not mentioned will be clearly understood by those skilled in the art from the following description.

To achieve the above-mentioned object, one embodiment of the present invention provides an apparatus for classifying immoral images, comprising: a text encoder unit that receives a learning text as an input to create a textual embedding vector; an image encoder unit that receives an image as an input to create a visual embedding vector; and a morality classification unit that receives either the textual embedding vector or the visual embedding vector as an input to create and output a classification result indicating whether the input text or image is moral or immoral, wherein the morality classification unit learns the classification results of the input learning texts only from a learning dataset containing a plurality of learning texts in which whether each learning text is moral or immoral is mapped to a binary class.

According to one embodiment, the text encoder unit may be a text encoder based on a contrastive language-image pre-training (CLIP) model, which maps a pair of text and corresponding image to the same embedding space.

According to one embodiment, the textual embedding vector may be an embedding vector in a joint embedding space to which a feature or feature vector of the input text and a feature or feature vector of the corresponding image are matched and mapped.

According to one embodiment, the image encoder unit may be an image encoder based on a contrastive language-image pre-training (CLIP) model, which maps a pair of text and corresponding image to the same embedding space.

According to one embodiment, the visual embedding vector may be an embedding vector in a joint embedding space to which a feature or feature vector of the input image and a feature or feature vector of the corresponding text are matched and mapped.

According to one embodiment, the morality classification unit may comprise a multi-layer perceptron (MLP) including a plurality of fully connected layers.

According to one embodiment, the plurality of fully connected layers may comprise Dropout Layer-Linear Layer-Tanh Layer-Dropout Layer-Projection Layer.

According to one embodiment, the morality classification unit may perform a learning process using a loss function (Lc) represented by the following equation:

$$\text{Loss Function } (Lc) = -\frac{1}{n}\sum_{i=1}^{n} \log\sigma(\hat{y}_i) + (-y_i)\log(1-\sigma(\hat{y}_i)),$$

where n is the number of texts in a minibatch, y is a one-hot vector in which only the ground-truth label is 1 and the others are 0, ŷ is the classification result output by the morality classification unit from the input textual embedding vector, and σ is a sigmoid function.

To achieve the above-mentioned object, another embodiment of the present invention provides a method for classifying immoral images, performed by an apparatus comprising a processor and a memory, the method comprising: a first step (a) of receiving a learning dataset as an input to create a textual embedding vector and receiving the created textual embedding vector to output a classification result indicating whether a learning text contained in the learning dataset is moral or immoral, wherein a learning process is carried out in the direction of minimizing a loss function (Lc); and a second step (b) of receiving an executable image to output a classification result indicating whether the executable image is moral or immoral, wherein the learning dataset contains only a plurality of learning texts in which whether each learning text is moral or immoral is mapped to a binary class, and wherein the loss function (Lc) is as follows:

$$\text{Loss Function } (Lc) = -\frac{1}{n}\sum_{i=1}^{n} \log\sigma(\hat{y}_i) + (-y_i)\log(1-\sigma(\hat{y}_i)),$$

where n is the number of texts in a minibatch, y is a one-hot vector in which only the ground-truth label is 1 and the others are 0, ŷ is the classification result output by the apparatus from the input textual embedding vector, and σ is a sigmoid function.

To achieve the above-mentioned object, still another embodiment of the present invention provides a computer program stored on a computer-readable medium, when executed on a computing device, performing: a first step (AA) of receiving a learning dataset as an input to create a textual embedding vector and receiving the created textual embedding vector to output a classification result indicating whether a learning text contained in the learning dataset is moral or immoral, wherein a learning process is carried out in the direction of minimizing a loss function (Lc); and a second step (BB) of receiving an executable image to output a classification result indicating whether the executable image is moral or immoral, wherein the learning dataset contains only a plurality of learning texts in which whether each learning text is moral or immoral is mapped to a binary class, and wherein the loss function (Lc) is as follows:

$$\text{Loss Function } (Lc) = -\frac{1}{n}\sum_{i=1}^{n} \log\sigma(\hat{y}_i) + (-y_i)\log(1-\sigma(\hat{y}_i)),$$

where, n is the number of texts in a minibatch, y is a one-hot vector in which only the ground-truth label is 1 and the others are 0, is the classification result output by the computer program from the input textual embedding vector, and σ is a sigmoid function.

According to the present invention as described above, the apparatus for classifying immoral images performs the learning process of creating and outputting a classification result indicating whether the learning text is moral or immoral by means of the embedding vector in the joint embedding space to which the feature or feature vector of the learning text, in which whether it is moral or immoral is mapped to a binary class at the level of general human intelligence, and the feature or feature vector of the corresponding image are matched and mapped, and thus regardless of the executable image input after the learning process, the joint embedding space, to which the feature or feature vector of the corresponding executable image belongs, is the same joint embedding space experienced during the learning process, making it possible to effectively classify the immoral images even in a situation where there is no suitable visual learning dataset with universal human morality.

The effects of the present invention are not limited to the effects mentioned above, and other effects not mentioned will be clearly understood by those skilled in the art from the description below.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram illustrating the ETHICS dataset for Commonsense Morality;

DETAILED DESCRIPTION OF THE INVENTION

Figure 1:
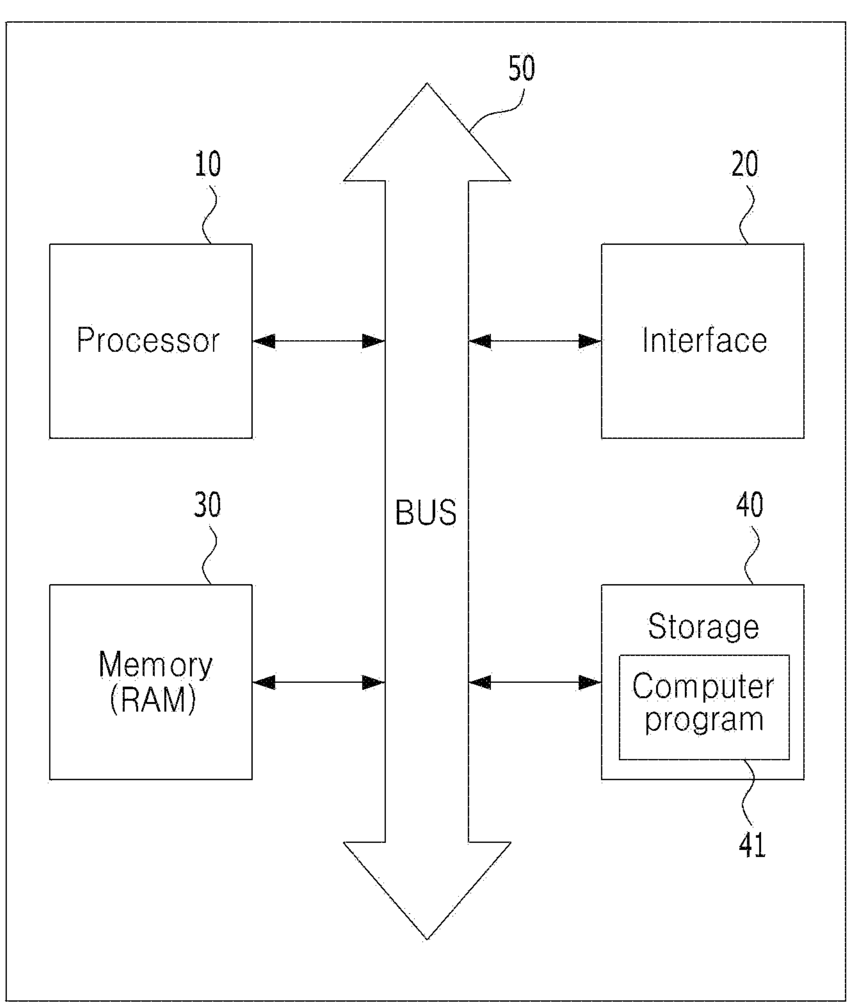
FIG. 1 is a diagram illustrating the overall configuration of an apparatus for classifying immoral images according to a first embodiment of the present invention.

Details regarding the objects and technical features of the present invention and the resulting effects will be more clearly understood from the following detailed description based on the drawings attached to the specification of the present invention. Preferred embodiments according to the present invention will be described in detail with reference to the attached drawings.

The embodiments disclosed in this specification should not be construed or used as limiting the scope of the present invention. It is obvious to those skilled in the art that the description, including the embodiments, of this specification has various applications. Therefore, any embodiments described in the detailed description of the present invention are illustrative to better illustrate the present invention and are not intended to limit the scope of the present invention to the embodiments.

The functional blocks shown in the drawings and described below are only examples of possible implementations. In other implementations, different functional blocks may be used without departing from the spirit and scope of the detailed description. Moreover, although one or more functional blocks of the present invention are shown as individual blocks, one or more of the functional blocks of the present invention may be a combination of various hardware and software components that perform the same function.

Furthermore, the term "comprising" certain components, which is an "open-ended" term, simply refers to the presence of the corresponding components, and should not be understood as excluding the presence of additional components.

In addition, if a specific component is referred to as being "connected" or "coupled" to another component, it should be understood that it may be directly connected or coupled to another other component, but there may be other components therebetween.

Hereinafter, preferred embodiments of the present invention will be described in detail with reference to the accompanying drawings.

FIG. 1 is a diagram illustrating the overall configuration of an apparatus 100 for classifying immoral images according to the first embodiment of the present invention.

However, this is merely a preferred embodiment to achieve the object of the present invention, and it is understood that some components may be added or deleted as needed and one component's role may be performed in conjunction with another component.

The apparatus 100 for classifying immoral images according to the first embodiment of the present invention may comprise a processor 10, a network interface 20, a memory 30, a storage 40, and a data bus 50 connecting these components. Moreover, it may also include other additional components required to achieve the object of the present invention.

The processor 10 may control the overall operation of each component. The processor 10 may be any one of a central processing unit (CPU), a microprocessor unit (MPU), a microcontroller unit (MCU), or an artificial intelligence processor commonly known in the art to which the present invention pertains. Furthermore, the processor 10 may perform operations for at least one application or program to perform the various functions which will be described with respect to an apparatus 1000 for classifying immoral images according to the second embodiment of the present invention.

The network interface 20 may support wired and wireless Internet communications for the apparatus 100 for classifying immoral images according to the first embodiment of the present invention and may also support other known communication methods. Therefore, the network interface 20 may be configured to include a corresponding communication module.

The memory 30 may store various information, commands and/or information and load one or more computer programs 41 from the storage 40 to perform a method for classifying immoral images according to a third embodiment of the present invention. In FIG. 1, RAM is shown as the memory 30, any of various storage media can also be used as the memory 30.

The storage 40 may non-temporarily store one or more computer programs 41 and large-capacity network information 42. This storage 40 may be any one of a nonvolatile memory, such as a read only memory (ROM), an erasable programmable ROM (EPROM), an electrically erasable programmable ROM (EEPROM), and a flash memory, a hard disk drive (HDD), a solid-state drive (SSD), a removable disk, or a computer-readable recording medium commonly known in the art to which the present invention pertains.

The computer program 41 may be loaded into the memory 30 and can be executed by one or more processors 10 to perform a first step (A) of receiving a learning dataset as an input to create a textual embedding vector and receiving the created textual embedding vector to output a classification result indicating whether a learning text contained in the learning dataset is moral or immoral, wherein a learning process is carried out in the direction of minimizing a loss function (Lc); and a second step (B) of receiving an executable image to output a classification result indicating whether the executable image is moral or immoral.

The briefly mentioned operations performed by the computer program 41 can be considered as one function of the computer program 41, and a more detailed description will be provided below in the description of the apparatus 1000 for classifying immoral images according to the second embodiment of the present invention.

The data bus 50 serves as a pathway for the movement of commands and/or information between the processor 10, the network interface 20, the memory 30, and the storage 40 as described above.

The apparatus 100 for classifying immoral images according to the first embodiment of the present invention as briefly described above may be in the form of a stand-alone device, for example, an electronic device or a server (including a cloud server). In this context, the electronic devices may include not only devices such as desktop PCs and server devices that are fixedly installed and used in one place, but also portable devices that are easy to carry, such as smartphones, tablet PCs, laptop PCs, PDAs, and PMPs, and it is suitable for any electronic device that includes a CPU corresponding to the processor 10 and has a network function.

Hereinafter, on the assumption that the apparatus 100 for classifying immoral images according to the first embodiment of the present invention is in the form of a "server" among the stand-alone electronic devices, the operations or calculations which are performed internally by the processor 10 for image classification will be described, which pertains to the apparatus 1000 for classifying immoral images according to the second embodiment of the present invention.

Figure 2:
FIG. 2 is an internal structure diagram illustrating the functional components to perform the operations or calculations of an apparatus for classifying immoral images according to a second embodiment of the present invention.
Figure 2:
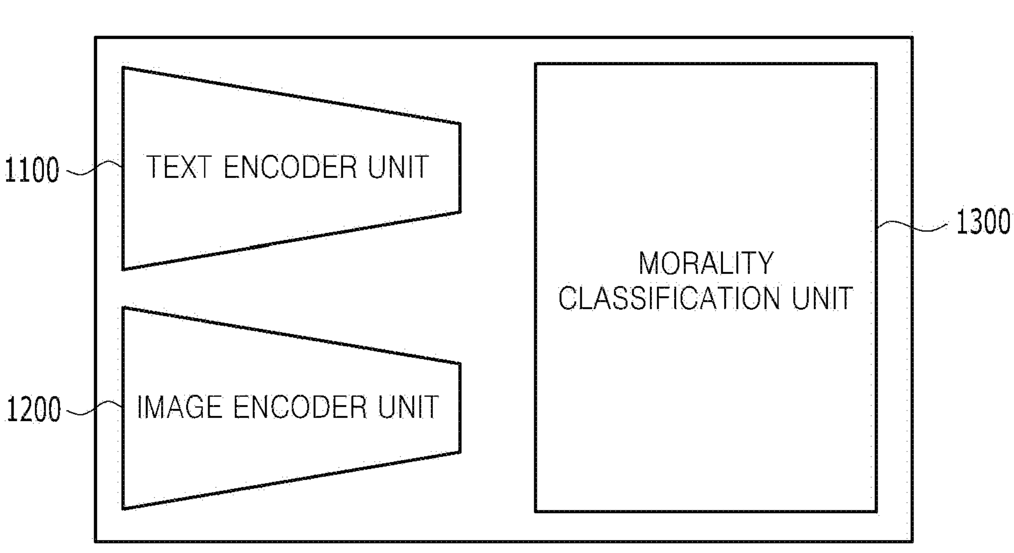

FIG. 2 is an internal structure diagram illustrating the functional components to perform the operations or calculations of an apparatus 1000 for classifying immoral images according to the second embodiment of the present invention.

Referring to FIG. 2, the apparatus 1000 for classifying immoral images according to the second embodiment of the present invention may comprise a text encoder unit 1100, an image encoder unit 1200, and a morality classification unit 1300, and may further comprise other additional components required to achieve the object of the present invention.

As mentioned above, the text encoder unit 1100, the image encoder unit 1200, and the morality classification unit 1300 are the functional components for the operations or calculations performed internally by the processor 10. Hereinafter, the apparatus 1000 for classifying immoral images according to the second embodiment of the present invention will be referred to as the "apparatus 1000", and in this context, the term "apparatus 1000" as used herein may have the same meaning as the processor 10.

The text encoder unit 1100 receives a text from a user and creates a textual embedding vector from the received text.

Here, the text encoder unit 1100 may be a text encoder based on the contrastive language-image pre-training (CLIP) model, which maps a pair of text and corresponding image to the same embedding space, and thus the text encoder unit 1100 may be composed of a transformer-based network.

Meanwhile, the text received by the text encoder unit 1100 is exclusively the learning text, in which whether it is moral or immoral is mapped to a binary class. In the case where an executable image, which will be described later, is received to classify an actual image, only the image encoder unit 1200 and the morality classification unit 1300 operate, because there is no separate text that is input to the text encoder unit 1100.

Here, the learning text may be included in the learning dataset, and the learning dataset may contain a plurality of learning texts. The ETHICS dataset for Commonsense Morality, some of which is shown as an example in FIG. 3, is a large dataset that provides diverse scenarios related to human ethics, making it an optimal dataset for use as a learning dataset. Furthermore, any large-scale text dataset where whether each text is moral or immoral is mapped to a binary class can be used as a learning dataset.

Meanwhile, the textual embedding vector created by the text encoder unit 1100 refers to a CLIP model-based feature or feature vector that can represent the input text, which will be described with respect to the CLIP model.

The image encoder unit 1200 receives an image as an input to create a visual embedding vector.

Here, like the text encoder unit 1100, the image encoder unit 1200 may also be a CLIP model-based image encoder, and thus the image encoder unit 1200 may also be comprised of a transformer-based network.

Meanwhile, from an input image, the image encoder unit 1200 creates a visual embedding vector, which corresponds to a CLIP model-based feature or feature vector that can represent the input image, which will be described with reference to FIG. 4 below.

Figure 4:
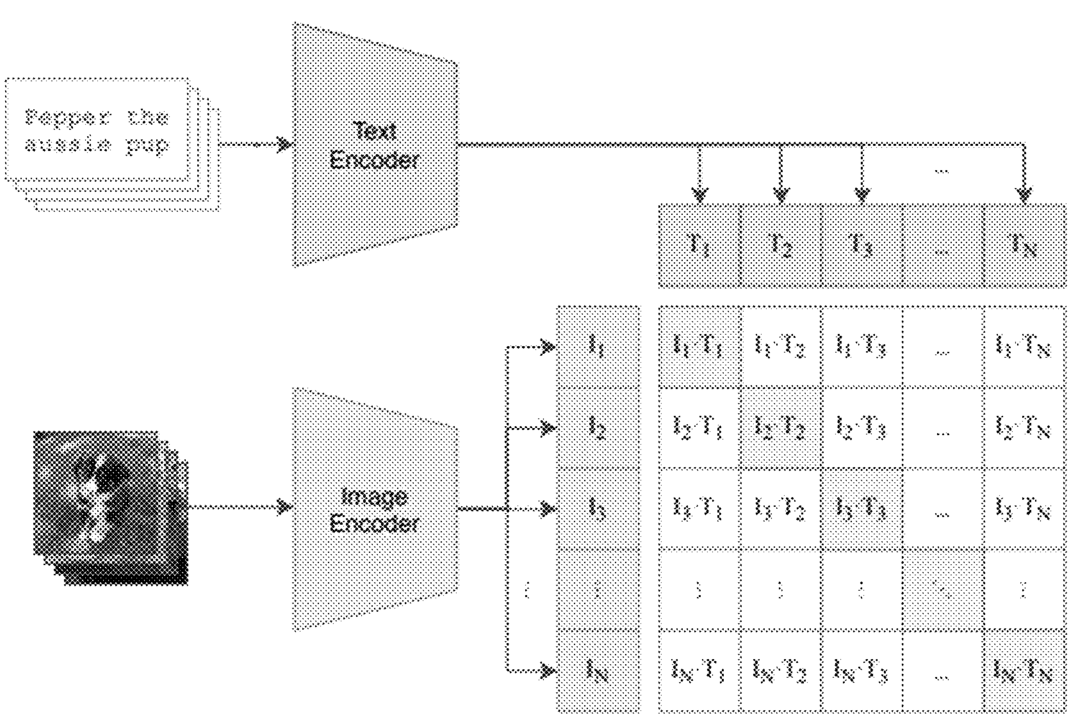
FIG. 4 is a diagram schematically illustrating a learning process of a CLIP model.

FIG. 4 is a diagram schematically illustrating a learning process of a CLIP model.

Referring to FIG. 4, it can be seen that the text is input to the text encoder at the top, and the image is input to the image encoder at the bottom. As described above, the text encoder can be used as the text encoder unit 1100 of the present invention, and the image encoder can be used as the image encoder unit 1200 of the present invention.

Meanwhile, since both the text encoder and the image encoder in FIG. 4 are encoders, they create the features or feature vectors that can represent the input texts or images. If $T_1$ to $T_N$ output from the text encoder are textual features or textual feature vectors (in this case, the number of input texts will be N), and $I_1$ to $I_N$ output from the image encoder are visual features or visual feature vectors (in this case, the number of input images will be N).

The CLIP model maps all textual features or textual feature vectors created by the text encoder and all visual features or visual feature vectors created by the image encoder one-to-one to each joint embedding space. For example, referring to FIG. 4, it can be seen that $T_1$ is mapped to all of $I_1$ to $I_N$, each mapped to an individual joint embedding space (each square represents one joint embedding space). CLIP has been trained with both texts and images in pairs with a size of 400 M, allowing it to perform various downstream tasks, such as zero-shot image classification, among others.

As can be seen from FIG. 4, the vectors mapped to the respective joint embedding spaces that have the highest similarity (using a cosine similarity) between the textual features or textual feature vectors and the visual features or visual feature vectors are highlighted with separate colors, and these joint embedding spaces can be considered a form of ground truth that is converged through the learning process.

Accordingly, the textual embedding vector created by the text encoder unit 1100 can be regarded as an embedding vector created (extracted) from the joint embedding space to which the input text belongs, and the visual embedding vector created by the image encoder unit 1200 can be regarded as an embedding vector created (extracted) from the joint embedding space to which the input image belongs, and it can be understood that the terms "textual embedding vector" and "visual embedding vector" have been assigned for the purpose of distinction.

Referring back to the description of FIG. 2, the images received by the image encoder unit 1200 are not included in the learning dataset, and only the executable images are used as the input of the image encoder unit 1200, which is because the images are not required for the learning of the morality classification unit 1300 which will be discussed later. Moreover, this is also because there are hardly any learning image datasets with actual standards of morality as binary classes and the text encoder unit 1100 is a text encoder based on the CLIP model.

The morality classification unit 1300 receives either a textual embedding vector or a visual embedding vector as an input to create and output a classification result indicating whether the input text or image is moral or immoral.

The morality classification unit 1300 performs the same role as a typical classifier in that it receives any input and provides a classification result from the input, but the difference lies in the fact that it provides a classification result indicating whether the input is moral or immoral. Here, the classification result indicating whether the input is moral or immoral is based on the level of general human intelligence without being limited to specific areas.

The ability to create such a classification result is due to the fact that the morality classification unit 1300 has learned the classification results of the input learning texts only from the learning dataset containing a plurality of learning texts in which whether each learning text is moral or immoral is mapped to a binary class. Therefore, if the learning dataset is the ETHICS dataset for Commonsense Morality, which is a large dataset that provides diverse scenarios related to human ethics, it is expected that the classification performance could be significantly improved.

Therefore, during the learning process, the morality classification unit 1300 receives only the textual embedding vectors created from the learning texts included in the learning dataset to create and output the classification result indicating whether the corresponding learning text is moral or immoral. Since the learning dataset contains a plurality of learning texts in which whether each learning text is moral or immoral is mapped to a binary class, the learning process can be performed by receiving the textual embedding vectors created from the learning texts and determining whether the created classification result is a ground truth or not. Moreover, the learning process can be carried out in the direction of minimizing a loss function (Lc) using the following loss function (Lc), which is Binary Cross-Entropy Loss (BCELoss):

$$\text{Loss Function } (Lc) = -\frac{1}{n}\sum_{i=1}^{n} \log\sigma(\hat{y}_i) + (-y_i)\log(1-\sigma(\hat{y}_i)),$$

where n is the number of texts in a minibatch, y is a one-hot vector in which only the ground-truth label is 1 and the others are 0, $\hat{y}$ is the classification result output by the morality classification unit 1300 from the input textual embedding vector, and $\sigma$ is a sigmoid function.

This morality classification unit 1300 may comprise a multi-layer perceptron (MLP) including a plurality of fully connected layers, and the plurality of fully connected layers may comprise Dropout Layer-Linear Layer-Tanh Layer-Dropout Layer-Projection Layer.

So far, the internal structure of the apparatus 1000 for classifying immoral images according to the second embodiment of the present invention has been described. Next, the case where the learning process is carried out using a learning dataset and the case where the classification of actual images is carried out by receiving executable images will be described below.

Figure 5:
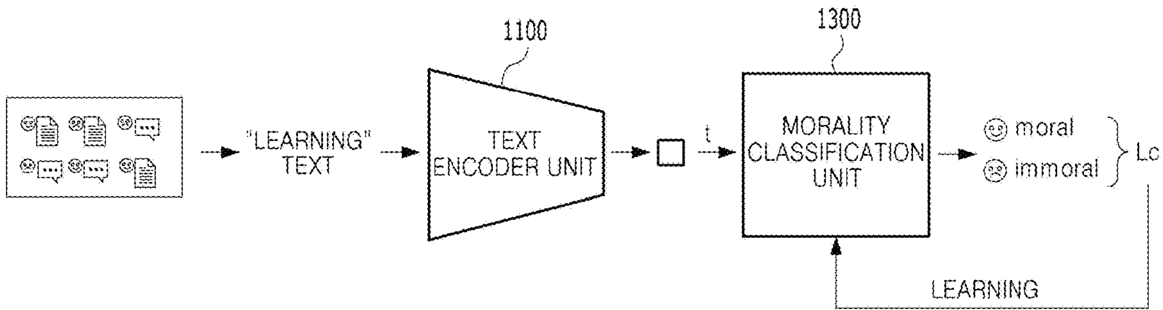
FIG. 5 is a diagram schematically illustrating a learning process of the apparatus for classifying immoral images according to the second embodiment of the present invention.

As described above, since the learning process is carried out using the learning dataset containing a plurality of learning texts in which whether each learning text is moral or immoral is mapped to a binary class, the learning dataset (in which whether each learning text is moral or immoral is mapped to a binary class) is input to the text encoder unit 1100 as shown in FIG. 5. Then, a textual embedding vector (t) is created, which is an embedding vector in a joint embedding space to which the corresponding learning text, more particularly, the feature or feature vector of the corresponding learning text belongs, and the created textual embedding vector (t) is input to the morality classification unit 1300, which in turn outputs a classification result indicating whether the learning text is moral or immoral is output. In this way, the learning process is repeatedly carried out in the direction of minimizing the loss function (Lc), and once the learning process using the loss function (Lc) is completed, the morality classification unit 1300 can classify the input texts as moral or immoral and output the classification results with high accuracy.

Figure 6:
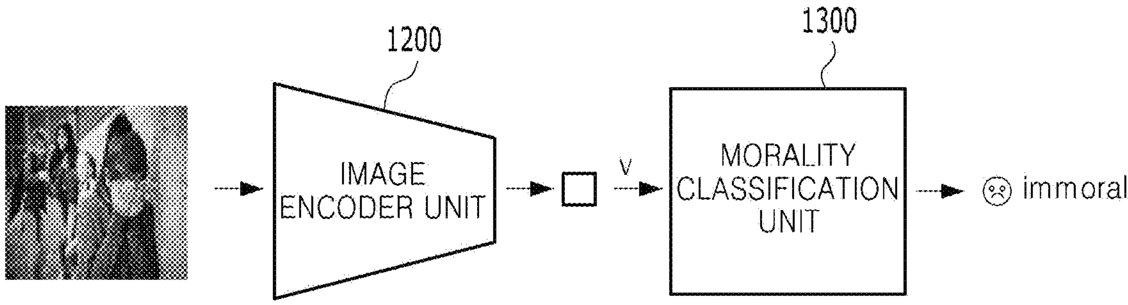
FIG. 6 is a diagram schematically illustrating a sampling process of the apparatus for classifying immoral images according to the second embodiment of the present invention.

Referring to FIG. 6, which schematically illustrates the process of receiving an executable image and classifying an actual image, as a certain executable image is input to the image encoder unit 1200, a visual embedding vector (v) is created, which is an embedding vector in a joint embedding space to which the corresponding image, more particularly, the feature or feature vector of the corresponding image belongs (the feature or feature vector of a text corresponding to the image may belong to this joint embedding space), and the created visual embedding vector (v) is input to the morality classification unit 1300. In this case, since the morality classification unit 1300 has already been trained to create and output classification results by means of the embedding vectors (textual embedding vectors) in the joint embedding spaces to which the features or feature vectors of the learning texts belong, the joint embedding space to which the feature or feature vector of the executable image belongs is one of the joint embedding spaces used during the learning process, and thus the morality classification unit 1300 can also create and output the classification results by means of the embedding vectors (visual embedding vectors).

Figure 7:
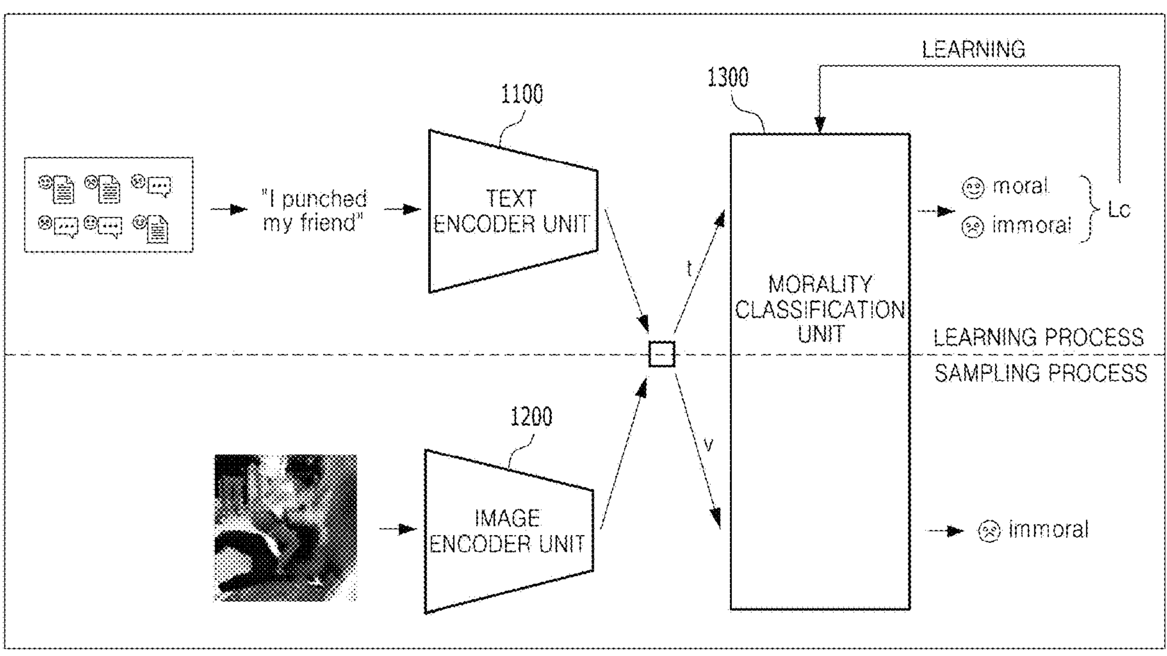
FIG. 7 is a diagram combining FIGS. 5 and 6 using an actual text and image.

For example, with reference to FIG. 7, assuming that the learning text is "I punched my friend", the morality classification unit 1300 carries out a learning process of receiving an embedding vector (textual embedding vector) in a joint embedding space to which the feature or feature vector of the text "I punched my friend" belongs, and creating and outputting a classification result. Afterwards, assuming that the executable image is an "image of two people punching each other", the morality classification unit 1300 can receive an embedding vector (visual embedding vector) in a joint embedding space to which the feature or feature vector of the "image of two people punching each other" belongs, and create and output a classification result, which is because the joint embedding spaces in both case are the same.

This can be equally applied even when the executable image is an "image of two people punching each other". In other words, for any image, the joint embedding space to which the feature or feature vector of the corresponding image belongs is likely to be the space already experienced by the morality classification unit 1300 in creating and outputting the classification results by means of the learning texts.

So far, the internal structure of the apparatus 1000 for classifying immoral images according to the second embodiment of the present invention has been described. According to the present invention, the apparatus 1000 performs the learning process of creating and outputting the classification results indicating whether each learning text is moral or immoral by means of the embedding vectors in the joint embedding spaces to which the features or feature vectors of the learning texts and the features or feature vectors of the corresponding images are matched and mapped (here, the term "corresponding" means that it has the highest cosine similarity). Therefore, regardless of the executable image input after the learning process, the joint embedding space, to which the feature or feature vector of the corresponding executable image belongs, is one of the joint embedding spaces experienced during the learning process, making it possible to effectively classify the immoral images even in a situation where there is no suitable visual learning dataset with universal human morality.

Figure 8:
FIGS. 8 and 9 show performance evaluation data of the apparatus for classifying immoral images according to the second embodiment of the present invention.
Figure 9:
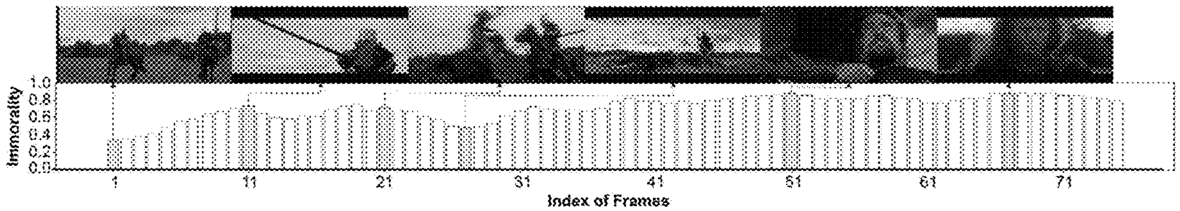

Referring to FIGS. 8 and 9, which shown performance evaluation data of the apparatus 1000 for classifying immoral images according to the second embodiment of the present invention, it can be seen from FIG. 8 that the apparatus 1000 can effectively classify the images as moral or immoral. Moreover, referring to the images classified as immoral, it can be seen that the apparatus 1000 can effectively classify the images as immoral, which are not extremely biased, but can be considered as immoral at the level of general human intelligence.

Furthermore, referring to FIG. 9, it can be seen that the apparatus 1000 for classifying immoral images according to the second embodiment of the present invention can classify not only individual images but also immoral images for each frame in the video where the images are connected, making it possible to distinguish segments within a piece of content containing immoral images over time.

Figure 10:
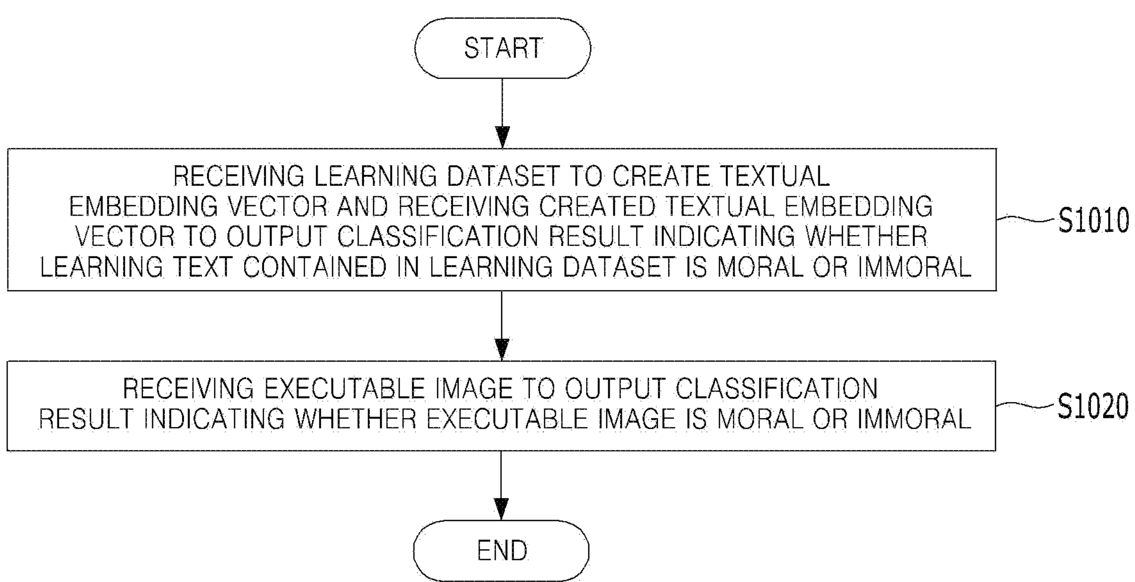
FIG. 10 is a flowchart illustrating the main steps of a method for classifying immoral images according to a third embodiment of the present invention.

Lastly, the apparatus 100 for classifying immoral images according to the first embodiment of the present invention and the apparatus 1000 for classifying immoral images according to the second embodiment of the present invention can be implemented as a method for classifying immoral images according to a third embodiment of the present invention as shown in FIG. 10, the method comprising: a first step (a) of receiving a learning dataset as an input to create a textual embedding vector and receiving the created textual embedding vector to output a classification result indicating whether a learning text contained in the learning dataset is moral or immoral, wherein a learning process is carried out in the direction of minimizing a loss function (Lc) (S1010); and a second step (b) of receiving an executable image to output a classification result indicating whether the executable image is moral or immoral (S1020), wherein the learning dataset contains only a plurality of learning texts in which whether each learning text is moral or immoral is mapped to a binary class, and wherein the loss function (Lc) is as follows:

$$\text{Loss Function } (Lc) = -\frac{1}{n}\sum_{i=1}^{n}\log\sigma(\hat{y}_i) + (-y_i)\log(1-\sigma(\hat{y}_i))\,..$$

Furthermore, the apparatus 100 for classifying immoral images according to the first embodiment of the present invention and the apparatus 1000 for classifying immoral images according to the second embodiment of the present invention can also be implemented as a computer program stored on a computer-readable medium according to a fourth embodiment of the present invention, the computer program, when executed on a computing device, performing: a first step (AA) of receiving a learning dataset as an input to create a textual embedding vector and receiving the created textual embedding vector to output a classification result indicating whether a learning text contained in the learning dataset is moral or immoral, wherein a learning process is carried out in the direction of minimizing a loss function (Lc); and a second step (BB) of receiving an executable image to output a classification result indicating whether the executable image is moral or immoral, wherein the learning dataset contains only a plurality of learning texts in which whether each learning text is moral or immoral is mapped to a binary class, and wherein the loss function (Lc) is as follows:

$$\text{Loss Function } (Lc) = -\frac{1}{n}\sum_{i=1}^{n} \log\sigma(\hat{y}_i) + (-y_i)\log(1-\sigma(\hat{y}_i)).$$

Although not described in detail for the sake of avoiding redundancy, all the technical features applied to the apparatus 100 for classifying immoral images according to the first embodiment of the present invention and the apparatus 1000 for classifying immoral images according to the second embodiment of the present invention can be equally applied to the computer program stored on a computer-readable medium according to the fourth embodiment of the present invention.

Although the embodiments of the present invention have been described with reference to the accompanying drawings, those skilled in the art to which the present invention pertains can understand that the present disclosure can be implemented in other specific forms without changing the technical spirit or essential features thereof. Therefore, the embodiments described above should be understood as illustrative in all respects and not restrictive.

BRIEF DESCRIPTION OF REFERENCE NUMERALS

10: processor
20: network interface
30: memory
40: storage
41: computer program
50: data bus
100, 1000: apparatus for classifying immoral images
1100: text encoder unit
1200: image encoder unit
1300: morality classification unit

What is claimed is:

1. An apparatus for classifying immoral, images comprising:

a text encoder unit that receives a learning text as an input to create a textual embedding vector;

an image encoder unit that receives an image as an input to create a visual embedding vector; and a morality classification unit that receives either the textual embedding vector or the visual embedding vector as an input to create and output a classification result indicating whether the input text or image is moral or immoral, wherein the morality classification unit learns the classification results of the input learning texts by receiving only the textual embedding vector created from the learning text included in a learning dataset containing a plurality of learning texts in which whether each learning text is moral or immoral is mapped to a binary class, wherein, after the learning, the morality classification unit classifies an executable image by applying the learned classification to the visual embedding vector generated by the image encoder unit without retraining using image data, and wherein the morality classification unit performs a learning process using a loss function (Lc) represented by the following equation:

$$\text{Loss Function } (Lc) = -\frac{1}{n}\sum_{i=1}^{n} \log\sigma(\hat{y}_i) + (-y_i)\log(1-\sigma(\hat{y}_i)),$$

where n is the number of texts in a minibatch, y is a one-hot vector in which only the ground-truth label is 1 and the others are 0, ŷ is the classification result output by the morality classification unit from the input textual embedding vector, and σ is a sigmoid function.

2. The apparatus for classifying immoral images of claim 1, wherein the text encoder unit is a text encoder based on a contrastive language-image pre-training (CLIP) model, which maps a pair of text and corresponding image to the same embedding space.

3. The apparatus for classifying immoral images of claim 2, wherein the textual embedding vector is an embedding vector in a joint embedding space to which a feature or feature vector of the input text and a feature or feature vector of the corresponding image are matched and mapped.

4. The apparatus for classifying immoral images of claim 1, wherein the image encoder unit is an image encoder based on a contrastive language-image pre-training (CLIP) model, which maps a pair of text and corresponding image to the same embedding space.

5. The apparatus for classifying immoral images of claim 4, wherein the visual embedding vector is an embedding vector in a joint embedding space to which a feature or feature vector of the input image and a feature or feature vector of the corresponding text are matched and mapped.

6. The apparatus for classifying immoral images of claim 1, wherein the morality classification unit comprises a multi-layer perceptron (MLP) including a plurality of fully connected layers.

7. The apparatus for classifying immoral images of claim 6, wherein the plurality of fully connected layers comprises Dropout Layer-Linear Layer-Tanh Layer-Dropout Layer-Projection Layer.

8. A method for classifying immoral images, performed by an apparatus comprising a processor and a memory, the method comprising:

a first step of receiving a learning dataset as an input to create a textual embedding vector and performing a learning process by receiving only the created textual embedding vector to output a classification result indicating whether a learning text contained in the learning dataset is moral or immoral, wherein the learning process is carried out in the direction of minimizing a loss function (Lc); and a second step of receiving an executable image to output a classification result indicating whether the executable image is moral or immoral, wherein the classification of the executable image is performed by applying the learning process to a visual embedding vector corresponding to the executable image without training on image data, wherein the learning dataset contains only a plurality of learning texts in which whether each learning text is moral or immoral is mapped to a binary class, and wherein the loss function (Lc) is as follows:

$$\text{Loss Function } (Lc) = -\frac{1}{n}\sum_{i=1}^{n} \log\sigma(\hat{y}_i) + (-y_i)\log(1-\sigma(\hat{y}_i)),$$

where n is the number of texts in a minibatch, y is a one-hot vector in which only the ground-truth label is 1 and the others are 0, ŷ is the classification result output by the apparatus from the input textual embedding vector, and σ is a sigmoid function.

9. A computer program stored on a non-transitory computer-readable medium, when executed on a computing device, performing:

a first step of receiving a learning dataset as an input to create a textual embedding vector and performing a learning process by receiving only the created textual embedding vector to output a classification result indicating whether a learning text contained in the learning dataset is moral or immoral, wherein the learning process is carried out in the direction of minimizing a loss function (Lc); and a second step of receiving an executable image to output a classification result indicating whether the executable image is moral or immoral, wherein the classification result for the executable image is generated by reusing the learning performed on textual embedding vectors without retraining using image data, wherein the learning dataset contains only a plurality of learning texts in which whether each learning text is moral or immoral is mapped to a binary class, and wherein the loss function (Lc) is as follows:

$$\text{Loss Function } (Lc) = -\frac{1}{n}\sum_{i=1}^{n} \log\sigma(\hat{y}_i) + (-y_i)\log(1-\sigma(\hat{y}_i)),$$

where n is the number of texts in a minibatch, y is a one-hot vector in which only the ground-truth label is 1 and the others are 0, ŷ is the classification result output by the computer program from the input textual embedding vector, and σ is a sigmoid function.

* * * * *